United States Patent
Rosner et al.

(10) Patent No.: US 10,019,351 B2
(45) Date of Patent: Jul. 10, 2018

(54) BOOTING AN APPLICATION FROM MULTIPLE MEMORIES

(71) Applicant: Cypress Semiconductor Corporation, San Jose, CA (US)

(72) Inventors: Stephan Rosner, Campbell, CA (US); Qamrul Hasan, Santa Clara, CA (US); Venkat Natarajan, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 69 days.

(21) Appl. No.: 14/319,079

(22) Filed: Jun. 30, 2014

(65) Prior Publication Data

US 2015/0378882 A1    Dec. 31, 2015

(51) Int. Cl.
*G06F 12/02*    (2006.01)
*G06F 9/4401*    (2018.01)
*G06F 9/445*    (2018.01)

(52) U.S. Cl.
CPC .......... *G06F 12/023* (2013.01); *G06F 9/4408* (2013.01); *G06F 9/44573* (2013.01); *G06F 2212/251* (2013.01)

(58) Field of Classification Search
CPC .............. G06F 12/023; G06F 2212/251; G06F 9/4408; G06F 9/44573
See application file for complete search history.

(56) References Cited

U.S. PATENT DOCUMENTS

| 8,627,223 B1* | 1/2014 | Katzer ................ G06F 9/4443 715/765 |
| 2004/0075677 A1* | 4/2004 | Loyall .................... G10L 13/00 715/706 |
| 2006/0227609 A1 | 10/2006 | Pascucci et al. |
| 2007/0113067 A1 | 5/2007 | Oh et al. |
| 2012/0144232 A1* | 6/2012 | Griffith ............... G06F 11/1482 714/4.12 |
| 2012/0331281 A1 | 12/2012 | Borras et al. |

FOREIGN PATENT DOCUMENTS

WO    2014063330 A1    5/2014

OTHER PUBLICATIONS

International Search Report for International Application PCT/US15/35354 dated Sep. 11, 2015; 2 pages.
Written Opinion of the International Searching Authority for International Application PCT/US15/35354 dated Sep. 11, 2015; 4 pages.

* cited by examiner

*Primary Examiner* — Yong Choe

(57) ABSTRACT

Disclosed herein are system, apparatus, article of manufacture, method and/or computer program product embodiments for booting an application from multiple memories. An embodiment operates by executing in place from a first memory a first portion of the application, loading a second portion of the application from a second memory, and executing the second portion of the application.

20 Claims, 5 Drawing Sheets

BOOTING AN APPLICATION FROM MULTIPLE MEMORIES

BACKGROUND

Generally, current approaches to booting an application use one of two general techniques. The first technique executes an application in place from a non-volatile, low latency memory, e.g. NOR memory. This technique has several disadvantages. Particularly, non-volatile, low latency memory is very expensive; even for simple applications, the amount of memory needed to store the entire application is costly. Attempts to reduce an application's footprint in memory, e.g. compression, adds computational complexity that affects performance by increasing execution time.

The second technique loads a memory from a non-volatile memory with a higher latency. This technique has its own disadvantages. Because of the higher latency, it is either not possible or undesirable to execute an application in place. Thus, the application needs to be loaded into another memory, typically a volatile memory, e.g. RAM, from which it is executed. The loading time affects performance by also increasing execution time.

SUMMARY

Provided herein are system, apparatus, article of manufacture, method and/or computer program product embodiments, and/or combinations and sub-combinations thereof, for booting an application from multiple memories.

An embodiment includes a method for booting an application from multiple memories. The method operates by executing in place from a first memory a first portion of the application, loading a second portion of the application from a second memory, and executing the second portion of the application.

Another embodiment includes a system for booting an application from multiple memories. The system includes a memory and at least one processor coupled to the memory. The processor is configured to execute in place from a first memory a first portion of an application, load a second portion of the application from a second memory, and execute the second portion of the application.

A further embodiment includes a tangible computer-readable device having instructions stored thereon that, when executed by at least one computing device, cause the computing device to perform operations. The operations include executing in place from a first memory a first portion of an application, loading a second portion of the application from a second memory, and executing the second portion of the application.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
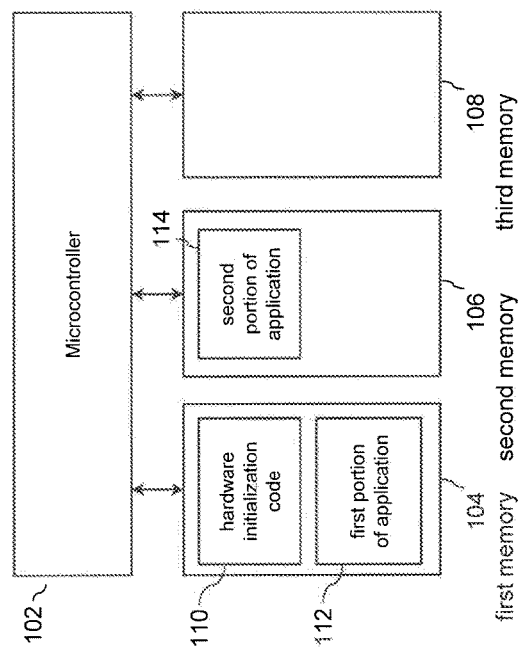
FIG. 1 is a block diagram of a system for booting an application from multiple memories, according to an example embodiment.

FIG. 1 is a block diagram of an example system 100 that includes a microcontroller (MCU) 102, a first memory 104, a second memory 106, and a third memory 108. Although system 100 is depicted as having one MCU and three memories, embodiments of the invention support any number of MCUs and any number of memories.

In an embodiment, MCU 102 stores data to or loads data from first memory 104, second memory 106, or third memory 108. For example, MCU 102 can boot an application from first memory 104 and second memory 106. MCU 102 can comprise an integrated circuit, application-specific integrated circuit (ASIC), field-programmable gate array (FPGA), processing core, digital signal processor (DSP), microcontroller (MCU), microprocessor (MPU), or any combination thereof.

An application can be divided into two or more portions. In an embodiment, the application is divided into at least a first portion 112 and a second portion 114, so that first portion 112 is executed in place from first memory 104 by the time second portion 114 has loaded from second memory 106. The application can be divided in numerous ways. For example, a programmer, software engineer or architect, or other developer can segment the code into the first portion 112 and second portion 114 to achieve the property that the first portion 112 is executed in place from first memory 104 by the time second portion 114 has loaded from second memory 106. Automated systems and/or processors for performing the following can also be used. As another example, the application can be developed using an application programming interface (API). The API can provide functionality so that a developer can specify which portions of the application belong in the first portion 112 and second portion 114. Alternatively or additionally, the API can provide functionality so that a developer can specify an order of priority of code, from which a compiler, linker, other tool, or any combination thereof can build the first portion 112 and second portion 114 to achieve the property that the first portion 112 is executed in place from first memory 104 by the time second portion 114 has loaded from second memory 106. In another embodiment, a compiler, linker, other tool, or any combination thereof segment the application into the first portion 112 and second portion 114 without input or instruction from a user to achieve the property that the first portion 112 is executed in place from first memory 104 by the time second portion 114 has loaded from second memory 106.

In an embodiment, first portion 112 of the application comprises application initialization code (AIC) and application execution code (AEC). AIC can include instructions that initialize the application. AEC can include instructions for executing the application once the application has been initialized.

In an embodiment, first memory 104 comprises a non-volatile, low latency memory that supports execution in place (XIP). XIP can refer to a method of executing a program directly from storage rather than copying it to one or more intermediate memories, e.g. random access memory (RAM). For example, first memory 104 can he any non-volatile memory, such as a NOR memory, a read only memory (ROM), an erasable programmable read only memory (EPROM), a mask ROM (MROM), a resistive random access memory (RRAM), a phase-change memory (PCM), or any combination thereof.

In an embodiment, first memory 104 comprises hardware initialization code (HIC) 110, a first portion 112 of an application, other code, or any combination thereof. MCU 102 can be configured to execute in place HIC 110, a first portion 112 of an application, other code, or any combination thereof.

In an embodiment, second memory 106 comprises a non-volatile memory having a higher latency than first memory 104. For example, second memory 106 can be a NAND memory, magnetic media (e.g. a hard drive), optical media (e.g. a CD-ROM or DVD), RRAM, a slow, multi-level NOR, or any combination thereof. In an embodiment, second memory 106 does not support XIP or cannot practically be used for XIP due to its latency.

In an embodiment, second memory 106 comprises a second portion 114 of the application. First portion 112 and second portion 114 may form the complete application or only a part of the application.

In an embodiment, third memory 108 comprises a volatile, low latency memory. For example, third memory 108 can be a RAM, dynamic RAM (DRAM), synchronous dynamic RAM (SDRAM), static RAM (SRAM), pseudo-static RAM (pSRAM), or any combination thereof. In an embodiment, an application may be copied into third memory 108 from first memory 104, second memory 106, another memory, or any combination thereof.

In an embodiment, MCU 102 can be configured to load second portion 114 of the application into third memory 108 and to execute second portion 114 of the application from third memory 108.

Figure 2:
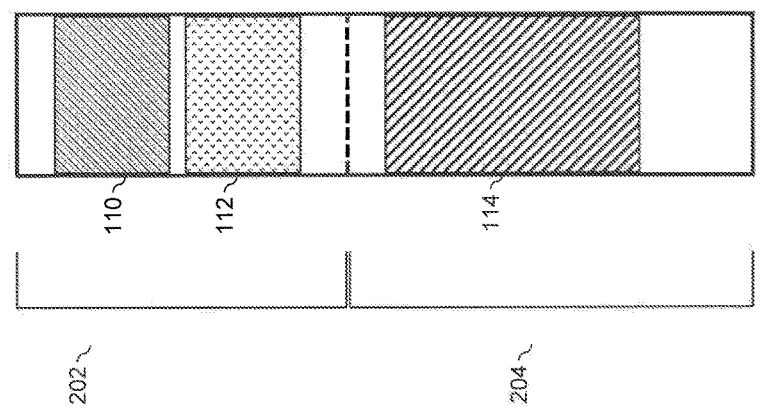
FIG. 2 is a block diagram of a memory address map, according to an example embodiment.

FIG. 2 is a block diagram of a memory address map 200, according to an example embodiment. Memory address map 200 reflects the address space layout code in memory. In an embodiment, MCU 102 uses memory address map 200 to locate or address HIC 110, first portion 112 of the application, second portion 114 of the application, other code, or any combination thereof.

Memory address map 200 comprises a first section 202 and a second section 204. First section 202 includes address mappings of HIC 110 and first portion 112 of the application. In an embodiment, first section 202 corresponds to first memory 104 and maps addresses thereto. For example, first section 202 can correspond to a NOR memory storing HIC 110 and first portion 112 of the application.

Second section 204 includes address mappings to second portion 114 of the application. In an embodiment, second section 204 corresponds to second memory 106, third memory 108, or any combination thereof, and maps addresses thereto. For example, second section 204 can correspond to a NAND memory or RAM storing second portion 114 of the application.

Although memory address map 200 has two sections with the particular layout depicted, embodiments of the invention support any number of sections or layouts. For example, sections 202 and 204 can be non-contiguous, interwoven, or any combination thereof. As another example, second memory 106 and third memory 108 can have their own regions in memory address map 200.

Figure 3:
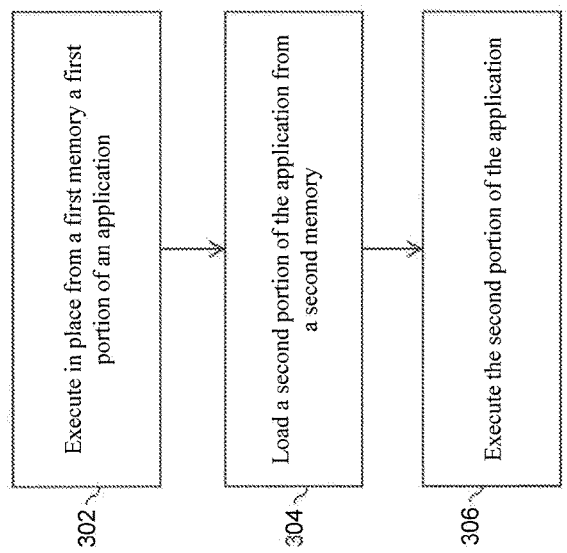
FIG. 3 is a flowchart illustrating a process for accessing a cache, according to an example embodiment.

FIG. 3 is a flowchart illustrating a process 300 for booting an application from multiple memories, according to an example embodiment. Process 300 can be performed by processing logic that can comprise hardware (e.g., circuitry, dedicated logic, programmable logic, microcode, etc.), software (e.g., instructions run on a processing device), or a combination thereof. For example, process 300 may be performed by MCU 102.

Figure 4:
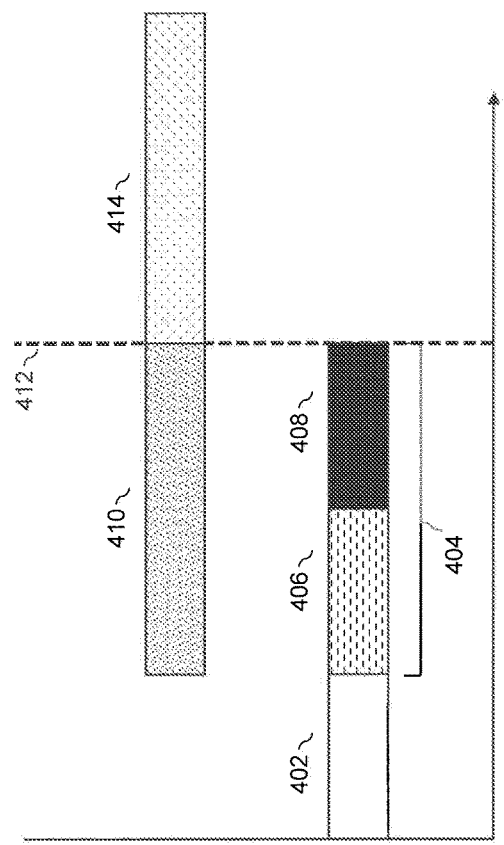
FIG. 4 is a block diagram of an execution flow, according to an example embodiment.

FIG. 4 is a block diagram of execution flow 400 resulting from process 300, according to an example embodiment, and will be discussed in conjunction with FIG. 3, although it should be understood that process 300 is not limited to the example of FIG. 4. In execution flow 400, the horizontal axis represents time during execution.

In block 302, first portion 112 of the application is executed in place from first memory 104. For example, first portion 112 can be executed directly from first memory 104 rather than copying it to one or more intermediate memories, such as second memory 106 or third memory 108. In an embodiment, MCU 102 executes in place first portion 112 of the application.

In an embodiment, HIC 110 is executed in place from first memory 104. MCU 102 can execute HIC 110 in place from first memory 104 before executing the first portion 112 of the application. FIG. 4 depicts execution of HIC 110 at block 402 and the execution of first portion 112 at block 404. In an embodiment, execution of the first portion 112 of the application includes execution of AIC at block 406 and execution of AEC at block 408.

Referring back to FIG. 3, in block 304, second portion 114 of the application is loaded from second memory 106. In an embodiment, MCU 102 loads second portion 114 of the application from second memory 106. FIG. 4 depicts loading second portion 114 at block 410.

In an embodiment, second portion 114 of the application is loaded from second memory 106 into third memory 108. For example, MCU 102 can load second portion 114 of the application from a NAND memory into a RAM memory.

In an embodiment, at least some of the executing in place of the first portion 112 of the application from the first memory and at least some of the loading the second portion 114 occur in parallel. For example, FIG. 4 depicts execution of the first portion 112 at block 404 and the loading of the second portion 114 at block 410 occurring concurrently.

In an embodiment, second portion 114 is loaded by the time the first portion 112 of the application has been executed in place. For example, FIG. 4 depicts the second portion 114 having been loaded by time 412, the time at which the first portion 112 of the application has been executed in place.

In an embodiment, the second portion 114 is loaded into third memory 108 by the time first portion 112 has been executed in place. For example, second portion 114 can be loaded from a NAND memory into RAM by the time first portion 112 has been executed in place in a NOR memory.

Referring back to FIG. 3, in block 306, second portion 114 of the application is executed. In an embodiment, MCU 102 executes second portion 114 of the application. For example, FIG. 4 depicts the second portion 114 being executed at block 414 after time 412, the time at which the first portion 112 of the application has been executed in place.

In an embodiment, second portion 114 of the application is executed from third memory 108. For example, second portion 114 can be executed from a volatile memory, e.g. RAM.

In an embodiment, second portion 114 of the application is executed using at least one of demand paging or shadow mode. For example, in shadow mode, second portion 114 may be loaded entirely from second memory 106 into third memory 108, and then second portion 114 is executed entirely from third memory 108. In another example using demand paging, the currently required part of the code, which may be represented as second portion 114, can be loaded and executed out of third memory 108. As one or more other portions of the application are required, they can be loaded and executed out of third memory 108 as needed.

Example Computer System

Figure 5:
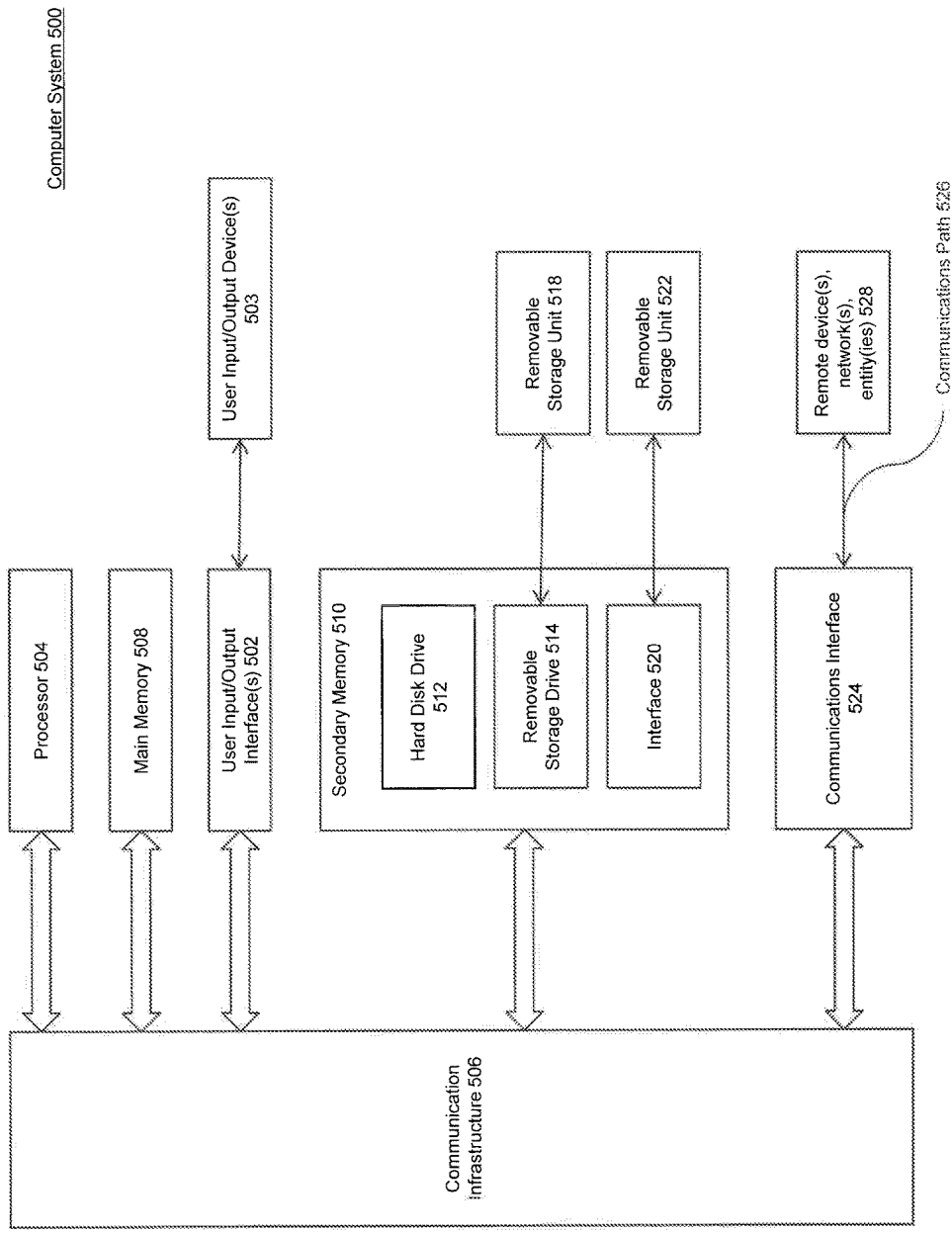
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc. Computer system 500 can also be any embedded system capable of performing the functions described herein, such as embedded systems available from Renesas, Freescale, TI, Spansion, etc.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for booting an application from multiple memories, comprising:

executing in place from a first memory a first portion of the application comprising application initialization code and application execution code;

loading a second portion of the application from a second memory; and executing the second portion of the application upon completion of the executing of the application execution code included in the first portion of the application, wherein the executing of the application execution code included in the first portion of the application completes concurrently with the completion of the loading of the second portion of the application such that the execution of the first portion of the application has been completed by the time the second portion of the application has been loaded.

2. The method of claim 1, further comprising:

executing in-place hardware initialization code from the first memory before executing the first portion of the application.

3. The method of claim 1, the loading further comprising:

loading the second portion of the application into a third memory.

4. The method of claim 3, wherein the first memory comprises a NOR memory, the second memory comprises a NAND memory, and the third memory comprises random access memory (RAM).

5. The method of claim 1, wherein the first memory comprises a low-latency, non-volatile memory and the second memory comprises a longer-latency, non-volatile memory.

6. The method of claim 1, wherein at least some of the executing in place from the first memory and at least some of the loading occur in parallel.

7. The method of claim 1, wherein the second portion of the application is loaded into the third memory by the time the first portion of the application has been executed in place.

8. The method of claim 1, the executing the second portion of the application further comprising:

executing the second portion of the application using at least one of demand paging or shadow mode.

9. A system, comprising:

a memory; and at least one processor coupled to the memory and configured to:

execute in place from a first memory a first portion of an application comprising application initialization code and application execution code;

load a second portion of the application from a second memory; and execute the second portion of the application upon completion of the executing of the application execution code included in the first portion of the application, wherein the executing of the application execution code included in the first portion of the application completes concurrently with the completion of the loading of the second portion of the application such that the execution of the first portion of the application has been completed by the time the second portion of the application has been loaded.

10. The system of claim 9, the at least one processor further configured to:

execute in-place hardware initialization code from the first memory before executing the first portion of the application.

11. The system of claim 9, wherein to load the second portion of the application the at least one processor is configured to:

load the second portion of the application into a third memory.

12. The system of claim 11, wherein the first memory comprises a NOR memory, the second memory comprises a NAND memory, and the third memory comprises random access memory (RAM).

13. The system of claim 9, wherein the first memory comprises a low-latency, non-volatile memory and the second memory comprises a longer-latency, non-volatile memory.

14. The system of claim 9, wherein at least some of the executing in place from the first memory and at least some of the loading occur in parallel.

15. The system of claim 9, wherein the second portion of the application is loaded into the third memory by the time the first portion of the application has been executed in place.

16. The system of claim 9, wherein to execute the second portion of the application the at least one processor is configured to:

execute the second portion of the application using at least one of demand paging or shadow mode.

17. A tangible computer-readable device having instructions stored thereon that, when executed by at least one computing device, causes the at least one computing device to perform operations comprising:

executing in place from a first memory a first portion of an application comprising application initialization code and application execution code;

loading a second portion of the application from a second memory; and executing the second portion of the application upon completion of the executing of the application execution code included in the first portion of the application, wherein the executing of the application execution code included in the first portion of the application completes concurrently with the completion of the loading of the second portion of the application such that the execution of the first portion of the application has been completed by the time the second portion of the application has been loaded.

18. The computer-readable device of claim 17, the loading comprising:

loading the second portion of the application into a third memory.

19. The computer-readable device of claim 17, wherein at least some of the executing in place from the first memory and at least some of the loading occur in parallel.

20. The computer-readable device of claim 17, wherein the second portion of the application is loaded into the third memory by the time the first portion of the application has been executed in place.

\* \* \* \* \*